(12) United States Patent
Shirley et al.

(10) Patent No.: US 7,249,281 B2
(45) Date of Patent: Jul. 24, 2007

(54) METHOD AND SYSTEM FOR BACKING UP AND RESTORING DATA OF A NODE IN A DISTRIBUTED SYSTEM

(75) Inventors: Brett A. Shirley, Bellevue, WA (US); Gregory C. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 10/628,806

(22) Filed: Jul. 28, 2003

(65) Prior Publication Data

US 2005/0028026 A1    Feb. 3, 2005

(51) Int. Cl.
*G06F 11/00*    (2006.01)
(52) U.S. Cl. ............................. 714/15; 714/13; 714/6
(58) Field of Classification Search ................ 714/6, 714/13, 15
See application file for complete search history.

(56) References Cited

U.S. PATENT DOCUMENTS

| | | | | |
|---|---|---|---|---|
| 5,867,668 | A * | 2/1999 | Spirakis et al. ............. | 709/234 |
| 5,875,290 | A * | 2/1999 | Bartfai et al. ................ | 714/13 |
| 6,012,150 | A * | 1/2000 | Bartfai et al. ................ | 714/4 |
| 6,026,414 | A * | 2/2000 | Anglin ........................ | 707/204 |
| 6,078,930 | A * | 6/2000 | Lee et al. .................... | 707/202 |
| 6,101,585 | A * | 8/2000 | Brown et al. ................ | 711/162 |
| 6,154,852 | A * | 11/2000 | Amundson et al. ............ | 714/5 |
| 6,260,069 | B1 * | 7/2001 | Anglin ........................ | 709/229 |
| RE37,364 | E * | 9/2001 | Cohn et al. .................... | 714/6 |
| 6,496,949 | B1 * | 12/2002 | Kanevsky et al. ............. | 714/47 |
| 6,611,923 | B1 * | 8/2003 | Mutalik et al. ................ | 714/4 |
| 6,665,815 | B1 * | 12/2003 | Goldstein et al. ............. | 714/20 |
| 6,771,843 | B1 * | 8/2004 | Huber et al. ................ | 382/305 |
| 6,934,822 | B2 * | 8/2005 | Armangau et al. ......... | 711/162 |
| 6,957,362 | B2 * | 10/2005 | Armangau ..................... | 714/20 |
| 2002/0133734 | A1 * | 9/2002 | Sarathy et al. ................. | 714/4 |
| 2004/0030951 | A1 * | 2/2004 | Armangau ..................... | 714/6 |
| 2004/0163009 | A1 * | 8/2004 | Goldstein et al. .............. | 714/6 |
| 2005/0028026 | A1 * | 2/2005 | Shirley et al. ................. | 714/6 |
| 2005/0216788 | A1 * | 9/2005 | Mani-Meitav et al. ......... | 714/6 |
| 2006/0026314 | A1 * | 2/2006 | Franchuk et al. ............. | 710/58 |

* cited by examiner

*Primary Examiner*—Scott Baderman
*Assistant Examiner*—Brian Assessor
(74) *Attorney, Agent, or Firm*—Workman Nydegger

(57) ABSTRACT

A method and system for backing up and restoring a data set on a node of a distributed system prevents conflicts in data replication caused by restoration from backup data. Before a node is backed up, state data of the data set of the node are set to mark the data set as "backed up." The data set also stores a lowest serial number for uncommitted changes. A snapshot of the data set, including the state data, of the node is then taken to provide a backup copy. When the backup copy is later used to restore the data set of the node, the "backed up" value of the state data of the restored data set serves as a notification to the replication server of the node that the data set has been restored, so that the replication server will switch to a new Node ID for labeling new changes for replication to other nodes in the distributed system.

23 Claims, 4 Drawing Sheets

METHOD AND SYSTEM FOR BACKING UP AND RESTORING DATA OF A NODE IN A DISTRIBUTED SYSTEM

BACKGROUND OF THE INVENTION

This invention relates generally to distributed computer systems, and more particularly to the backup and restore operations of nodes in a distributed system.

TECHNICAL FIELD

A distributed computer system has multiple nodes distributed over a computer network. Changes made to the data of one node, such as the creation of new objects and modification or deletion of existing of objects, are replicated to other nodes in the distributed system. In one implementation of a distributed system, to keep track of the replicated data, each change originated on a node is identified by a node identification (Node ID) of that node and a Universal Serial Number (USN) assigned to that change. The Node ID and the USN of a change together form a label that uniquely identifies the change to allow the other nodes to tell whether they have received that change and replicated it in their local data sets.

To prevent a catastrophic loss of data, most computer systems back up their data contents periodically. If the data in the data set of a node are somehow damaged or lost due to errors or other problems, the backup copy can be used to restore the contents of the data set. The recent developments of the backup technology, such as the Volume Shadow Copy Services (VSS) component of the Windows XP operating system of Microsoft Corporation, allow a snapshot (or "point-in-time" copy) of the data contents to be taken rapidly. The snapshot backup copies guarantee "crash consistency" and can be used to restore the data set.

The restoration of data contents from a backup copy, however, complicates the data replication operation in a distributed system and may cause inconsistency in the replicated changes if it is not handled properly. Because the backup copy of a node only records the contents of the local data set of that node at the time of the backup, changes made to the local data set after the last backup time are lost if the node is restored using the backup copy. Some of those changes made after the backup may, however, have already been replicated to other nodes in the distributed system. After the node is restored, it will not remember the changes it made after the backup. If the node treats the highest USN in the backup copy as the last-assigned USN and assigns subsequent numbers in the series to new changes, the new changes will be using the same USNs of those already replicated to other nodes, causing conflicts in the data replication. One effective solution that has been used to avoid this inconsistency problem is to assign a new Node ID to the restored node so that the new changes will be labeled with the new Node ID. As a result, the new changes can be distinguished from the old changes made after the backup and prior to the restoration.

The use of a new Node ID after restore guarantees the uniqueness of the new changes made by the restored node within the system. It, however, does not guarantee that the conflicts can be completely avoided. This is because in order to cause the switching to a new Node ID, the server on the node that is in charge of the data replication has to be notified that the system has been restored. If the replication server is not running during the restore operation, it will not be aware of the restoration and will treat the highest USN in the restored data as the last-assigned USN and continue to assign USNs in the sequence without changing the Node ID. In addition, it will not be able to calculate with any accuracy the USN with which to replicate back from other nodes the changes it created after the backup.

Another problem that has to be addressed after restore is getting re-updated with changes made on the node after the backup by receiving those changes from another node to whom the changes was replicated earlier. At the time of the backup operation, some of the changes may not have been committed. After the backup and before the restore, some of the uncommitted changes may become committed and some new changes may be committed, and those committed changes may be replicated to other nodes. When the node is restored, it loses information about which changes have been replicated to the other nodes after the backup. To ensure that its local data contents are consistent with those of the other nodes, the node has to replicate those changes back from the other nodes in the distributed system. The problem is in estimating how far back in the series the changes should be replicated back from the other nodes. If the replicating-back goes back too far, many changes will be unnecessarily replicated. If the replicating-back does not go back far enough, however, there will be a zone in the series of changes originated on the node that will not be replicated back to the node and, as a result, be missing from the local data set of the node.

SUMMARY OF THE INVENTION

In view of the foregoing, the present invention provides a method and system for backing up and restoring data on a node of a distributed system that prevents conflicts in replicated changes caused by restoration and does not require the presence of the replication server of the node during restoration. Each node in the distributed system has a set of data that are replicated to and/or from other nodes of the distributed system. In accordance with the invention, state data of the data set of the node are stored before a backed up operation to indicate the state of the data set as "backed up." The data set also includes a Lowest Uncommitted USN record that indicates the lowest one of the USNs of changes that have not been committed yet. A snapshot of the data set of the node is then taken to provide a backup copy. After the backup operation, the state data of the data set are reset to indicate that the data set is in a "normal" state. If the backup copy is later used to restore the data set of the node, the "backed up" value of the data set state data serves as a notification to the replication server of the node that the data set has been restored. Since the notification is provided by means of the state data, the replication server does not have to be running during the restoration operation to receive the notification. When the replication server starts and sees that the data set is in the "backup" state, it knows that the data set of the node has been restored, and switches to a new Node ID for labeling new changes to the data set. The Lowest Uncommitted USN gives the replication server an indication of where it could be at the time of the backup in terms of replicating changes to the other nodes of the distributed system. The node can then replicate back from the other nodes changes that have the old Node ID and USNs equal to or greater than the Lowest Uncommitted USN, thereby ensuring that it has the same changes it replicated earlier to the other nodes after the backup and before the restore operation.

DETAILED DESCRIPTION OF THE INVENTION

Figure 1:
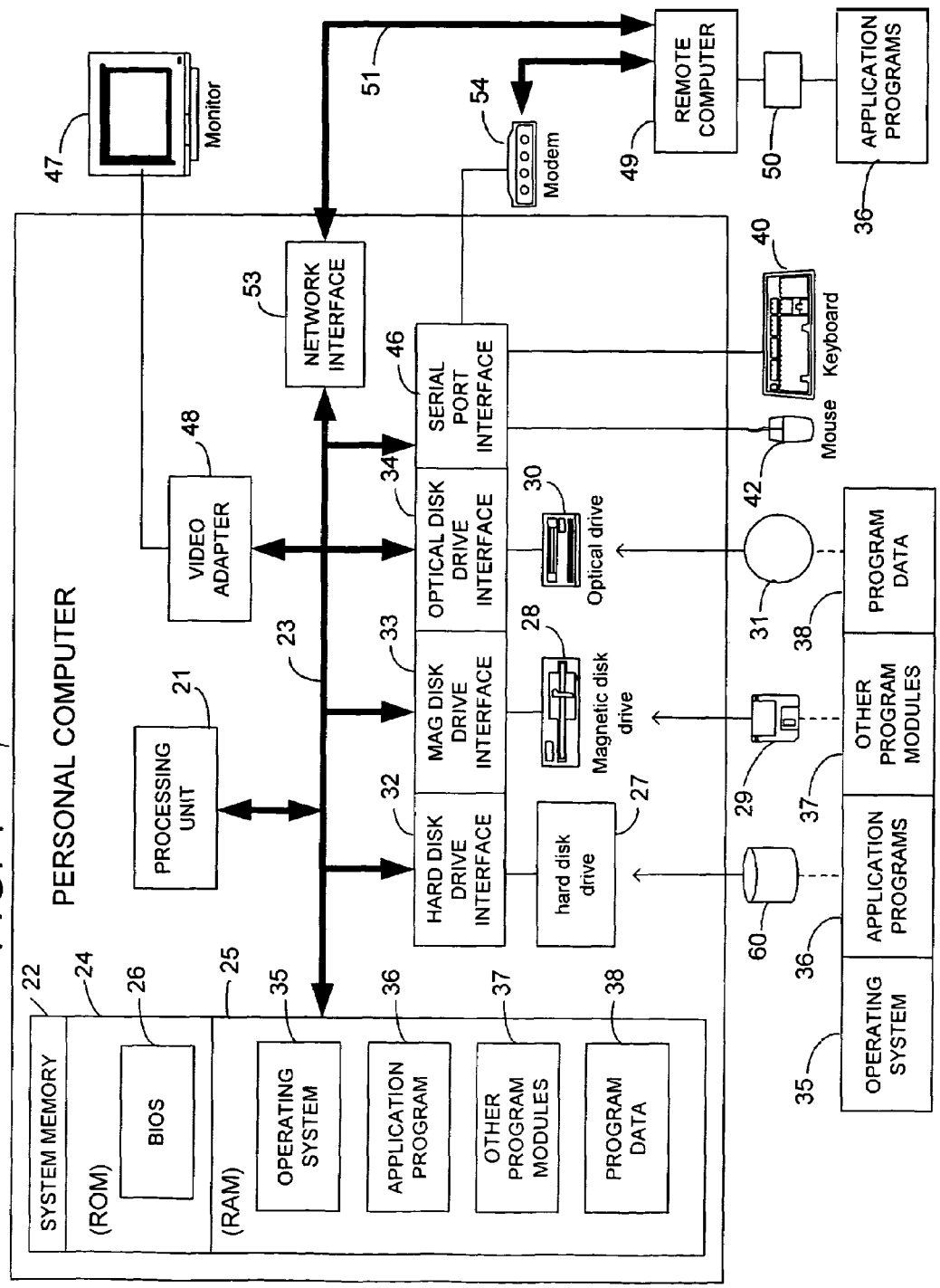
FIG. 1 is a block diagram generally illustrating an exemplary computer system on which a node of a distributed system may be implemented to practice the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing nodes in a distributed system that implements data backup and restore operations in accordance with the invention, and the system and method of the invention will be described in greater detail with reference to FIGS. 2–4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention is directed to a way to backup and restore the contents of a data set of a node in a distributed system that effectively prevents conflicts in data replication caused by restoration of the node from the backup copy. The backup method also provides effective replication recovery after the data set is restored by replicating back from the other nodes in the distributed system mainly changes that the current node replicated out earlier but does not have after being restored. For illustration purposes, FIG. 2 shows an embodiment of the invention in which the distributed system is a directory service system, such as the Active Directory of Microsoft Corporation, that is a multi-master distributed system. It will be appreciated, however, that the invention can be advantageously used in other types of distributed systems that use increasing serial numbers to label new changes made by a node and use backup copies to restore the local data contents of the node.

Figure 2:
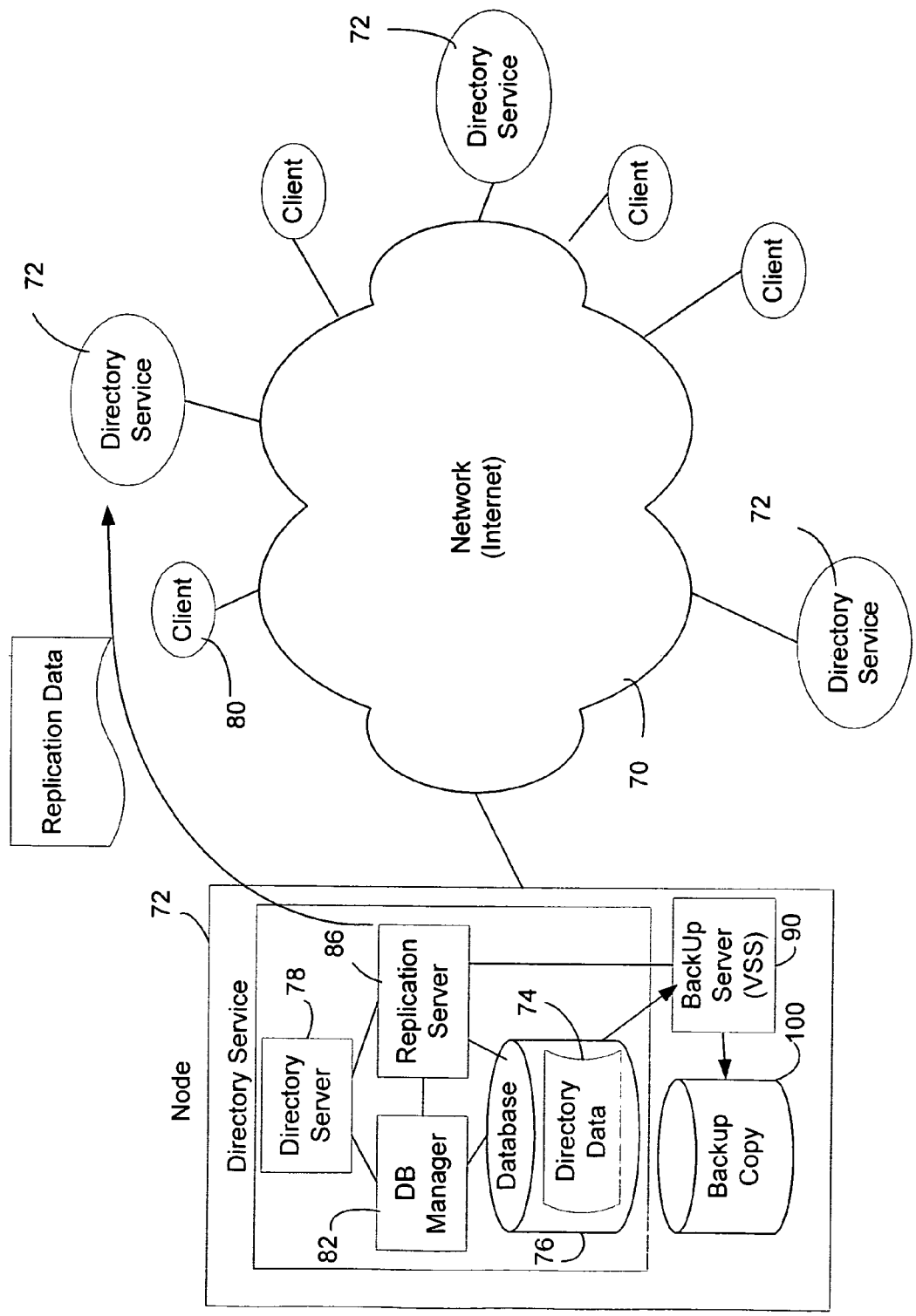
FIG. 2 is a schematic diagram showing a directory service system that is implemented as a distributed system and has a plurality of nodes each functioning as a directory service and having a local database for storing a set of directory data.

As shown in FIG. 2, the directory service system has multiple directory service nodes 72 distributed over a computer network 70, such as the Internet. Each node 72 maintains a local database 76 for storing a set of directory data 74 used for providing directory services, and has a directory server 78 for responding to directory service requests from clients 80 on the network. Changes made to the set of directory data 74 in the local database 76 of a node, such as creating a new user account, changing a user's password, etc., are replicated to the other nodes in the directory service system. To that end, each directory service node has a database manager 82 for managing the directory data in the local database 76 of the node, and a replication server (or engine) 86 for handling the replication of changes of directory data originated on the node to other nodes in the directory service system. Moreover, to prevent catastrophic data losses, each node has a backup server 90 that periodically is capable of taking take a snapshot of the contents of the directory data 74 in the database 76 at a given time, and the snapshot can be used as a backup copy of replicated directory data set in the database. The snapshots preferably are taken at scheduled intervals but may also be taken upon request. In a preferred embodiment, the backup server is the Volume Shadow Copy Services (VSS) of the Windows Server 2003×P operating system or future versions of Windows operating system of Microsoft Corporation.

To uniquely identify the changes made to the data set in one such node so that they can be properly replicated across the network, each change is identified by a Node ID of the node on which the change is originated, and a Universal Serial Number (USN). The Node ID identifies the originating node and distinguishes the originating node from the other nodes in the distributed system, and the USN is a monotonically increasing serial number that is, for example, 64-bits long. The Node ID and the USN assigned to a change form a "signature" that uniquely identifies the change across all nodes in the distributed system. In a preferred embodiment, the Node ID is calculated as a Globally Unique Identifier (GUID), i.e., it is calculated using the Globally Unique Identifier method developed by Microsoft Corporation.

To facilitate an understanding of the invention by way of example, the following description first provides a sequence of events occurring to two nodes of a distributed system that does not implement the invention to illustrate the problems that may be arise if the data backup and restore are not properly handled. The solution to the problems by using the backup process in accordance with the invention is then described. In the event sequence described below, the time point indicators T1-TN indicate the timing sequence of the respective events. The two nodes, Node A and Node B, involved in the event sequence start with the following states: A(NID=322, NextUSN=1352); B(NID=833, NextUSN=897), where "NID" means the Node ID of the respective node, and "NextUSN" is the next USN to be assigned to a new change by the node.

The following sequence of events then occurs:

T1: Node A makes the following changes:
  Change X (NID=322, USN=1352), which does not immediately commit;
  Change Y (NID=322, USN=1353), which commits immediately;
  Change Z (NID=322, USN=1354), which commits immediately.

T2: Node A is backed up, with NID=322 and NextUSN=1355.

T3: Node A makes more changes:
  Change X commits;
  Change P (NID=322, USN=1355), which commits immediately;
  Change D (NID=322, USN=1356), which commits immediately.

T4: Node B replicates Changes X, Y, Z, P and D from Node A to its local data set.

T5: Node A crashes and is restored with its backup data stored at T2. It is assumed that the replication server of the Node A is not running during the restore operation so that it is not notified of the restore.

T6: Node A boots off the restored data.

At the time point T5, after being restored, Node A has changes Y and Z, but does not have changes X, P, D. Moreover, the restored data indicates that NID=322 and NextUSN=1355. The replication server of Node A is unaware that the system has been restored and assumes that the NID and NextUSN are still valid. The next event is:

T7: Node A is requested to make a new change: Change Q.

Based on the restored data set, the replication server will label Change Q as: NID=322, USN=1355. The problem is that this (NID, USN) combination belongs to Change P that has been made at T3. Since Node B has already received replication data for Change P with USN=1355, it will not request for Change Q from the Node A. Also, Node A does not have Change X since it is committed after the backup copy has been stored at T2. Thus, it is not up to date with respect to its own changes that have been replicated to Node B at T4. Furthermore, Node A does not know which USN it should use to begin replicating from Node B on NID=322, since it cannot be certain that Change X ever committed.

In accordance with the invention, these problems are effectively addressed by changing the backup operation at T2 so that it includes the following steps:

T2a: Node A initiates a backup operation with NID=322 and NextUSN=1355.

T2b: Node A writes the following data into its data storage to indicate the state of its data set:

1. The state data of the data set is marked as "backed-up".
2. A USNAtBackUp number, which is the lowest uncommitted USN at this time.

In the current example, USNAtBackUp is 1352.

T2c: Node A takes a snapshot of the data set to generate a backup copy.

T2d: Node A unmarks the data set by changing the state data of the data set to "Normal."

The replication server then continues to operate in the normal mode.

Figure 3:
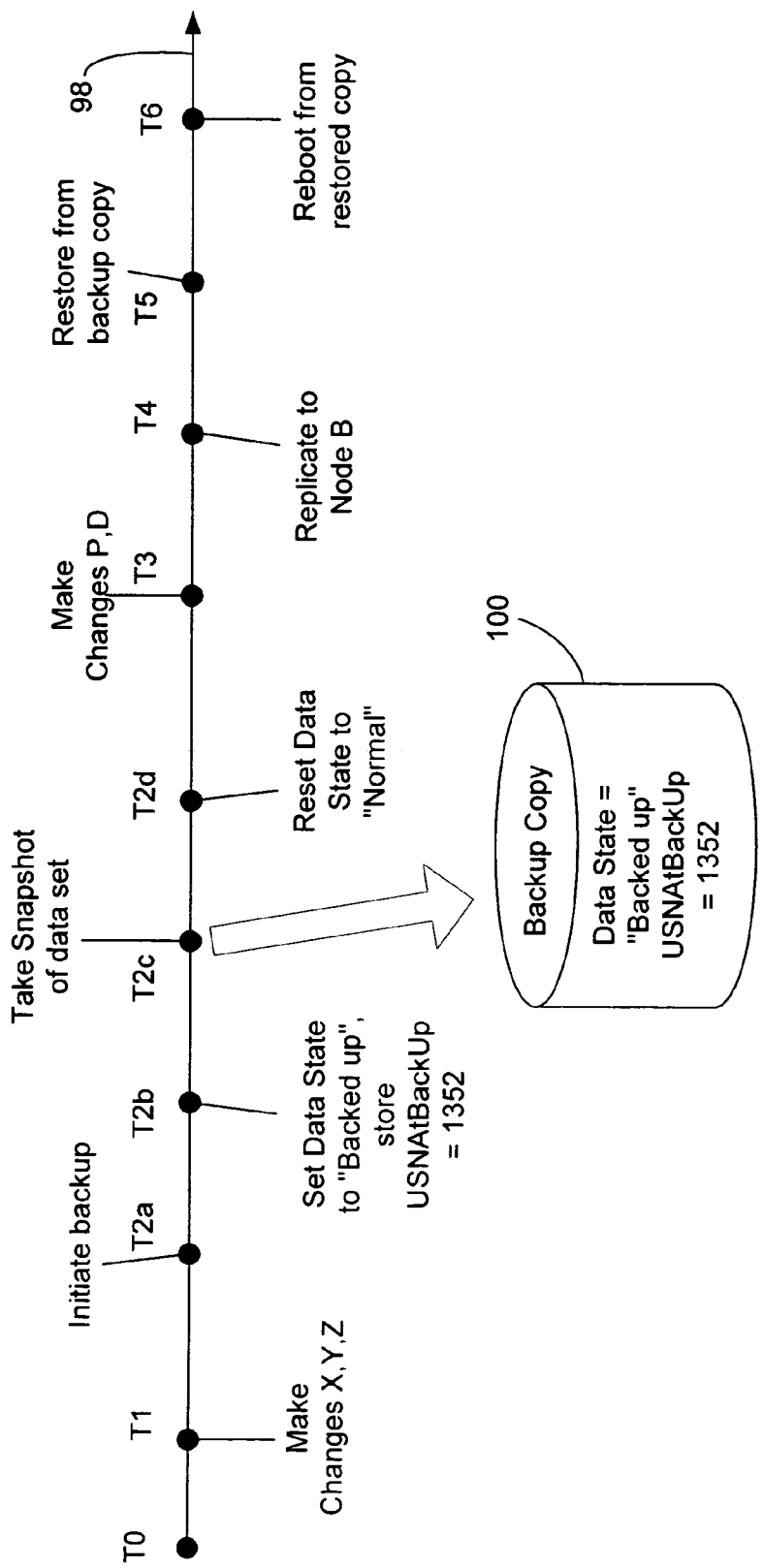
FIG. 3 is a timeline of a backup operation in accordance with an embodiment of the invention.
Figure 4:
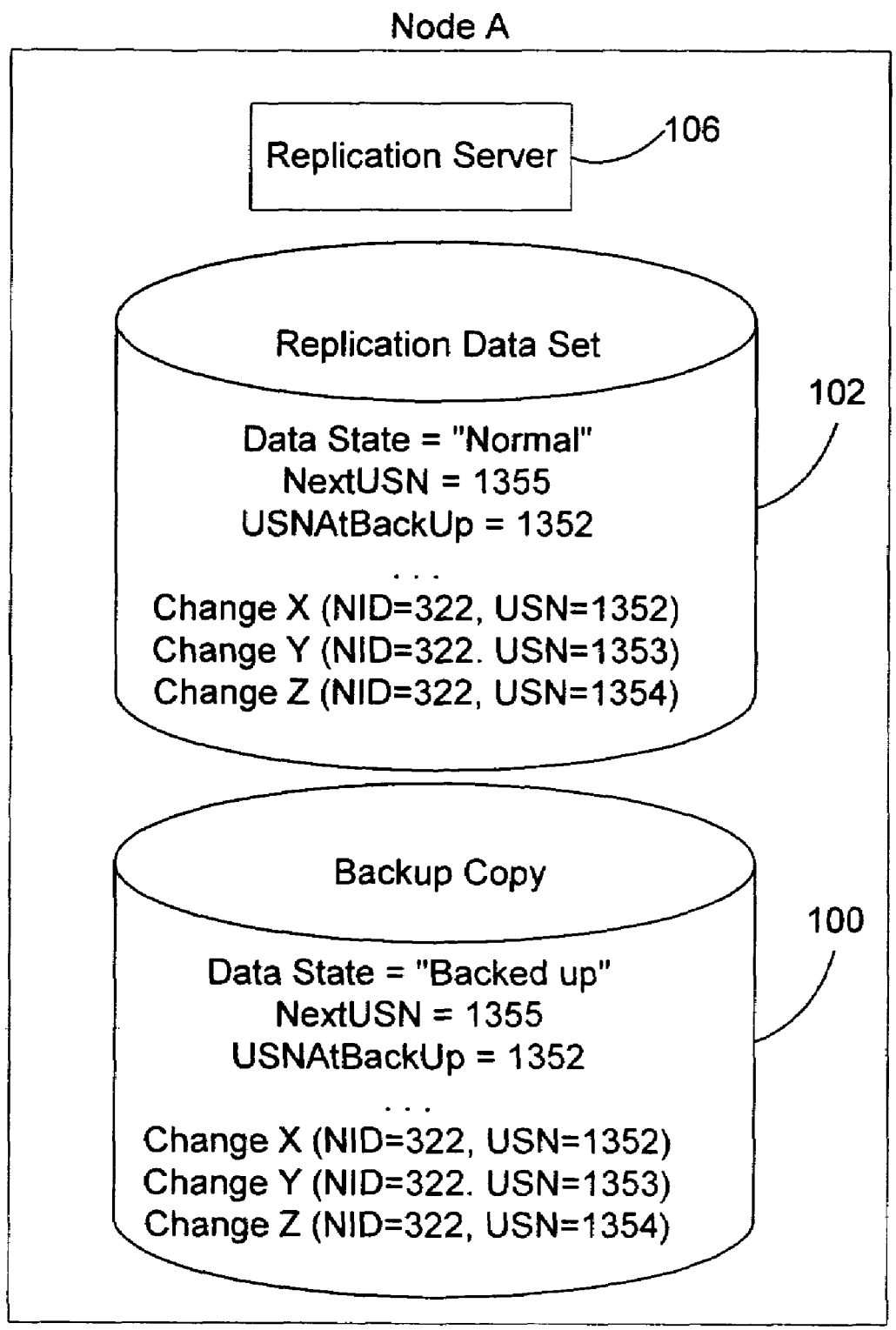
FIG. 4 is a schematic diagram showing the contents of the data set and a backup copy of a node after the backup operation of FIG. 3.

This sequence of backup operation is illustrated in FIG. 3 along the timeline 98. The contents of the data set 102 of Node A and the backup copy 100 at the time point T2d are shown in FIG. 4. It should be noted that the backup copy 100 generated at T2c has the data set state data marked as "backed-up" as set at T2b, which is not changed when the state data of the data set data are re-marked to "normal" at T2d. Later at the time point T6, when the system of Node A is rebooted from the restored data, the replication server 106 notes that the state data of the data set indicates the "backed-up" state and knows that the system has been restored with the backup data. Thus, the "backed-up" state data in the backup copy serves the function of notifying the replication server 106 that Node A has been restored. In response, the replication server changes the NID of Node A to a new value. In this way, no explicit notification mechanism is required during the restore process to cause the replication server to change the NID, and the replication server is not required to be running during the restoration.

In accordance with another feature of the invention, the USNAtBackUP value, which is the lowest USN of any uncommitted changes at the time of the backup, is also stored in the data set and becomes part of the snapshot. In the embodiment shown in FIG. 2, when the backup server 90 is about to take the snapshot, it informs the distributed server (and thus the replication engine 86 inside) that a snapshot will be taken. The replication engine 86 then writes the USNAtBackUp value into the database 76 and sets the state flag in the database to "backed-up," and the backup server 90 then takes a snapshot of the database. After the snapshot is taken, the backup server 90 tells the replication engine 86 that the backup is complete, and the replication engine 86 resets the state flag to "normal." Storing the USNAtBackUp value allows the node to know exactly which changes have been guaranteed to be completed (due to the commitment) at the time of backup. This number can be used later by the node after being restored to determine which changes it has replicated to other nodes before the restore should now be replicated back to it from the other servers.

In a conventional backup operation, only the NextUSN value is stored in the backup copy. When the node is restored from the backup copy, the system has to make a guess as to which through what USN all previous changes under the old Node ID have been committed, and throw away "claims" of knowing about changes after that guessed point of the lowest USN of incomplete changes were started before NextUSN but completed after the backup, and try to replicate those changes back from the other nodes in the distributed system. In an environment where there can be a large number of changes made in a given time period, the guess can be off significantly and is highly unreliable. If the guess is too far back, a large amount of changes may be re-replicated unnecessarily. It is a more serious problem, however, if the guess does not go back enough. In that case, changes may be lost on the current node because they are not replicated from the other nodes. As a result, the changes under the old Node ID on the current node may be inconsistent with changes under the old Node ID on the other nodes.

In contrast, in accordance with the invention, by storing the updated USNAtBackUp data in the data set before backup, the node can tell directly from the backup copy the point up to which the changes were completed at the time of the backup operation. Since changes are not replicated to the other nodes in the distributed system unless they are completed, the USNAtBackUp value provides an upper limit of the USNs of changes that have been replicated to the other nodes at the time of the backup. After the restore, the current node does not know which changes might have been completed and replicated to the other nodes after the backup and before the restore. The USNAtBackUp value can then be used as a low watermark for the earliest-in-time change under the old Node ID the node might have completed and replicated out after the backup, and the node will want to replicate back from the other nodes any changes under the old Node ID with USNs equal to or higher than the USNAtBackUp. Continuing the example discussed above, at the time of the backup at T2, Node A has NextUSN=1355, but USNAtBackUP=1352. When Node A is restored and comes back online at T7, it makes a new change with USN=1355, but with a new Node ID. At time T8, Node A requests Node B to replicate data to it and tells Node B it only knows of changes with NID=322, USN=1351 or lower. In response, Node B will send changes with NID=322 and USN=1352 or higher to Node A. In the given example, the changes X, P and D will be sent by Node B back to Node A.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer executable instructions for performing steps for backing up and restoring a data set of a node in a distributed system, comprising:

initiating a back up operation of an original data set, the original data set having state data indicating that the original data set is original data rather than backup data;

before making a backup copy of the original data set, changing the state data of the original data set to indicate that the original data set is backup data after changing the state data of the original data set, taking a snapshot of the contents of the original data set, including the state data indicating that the original data set is backup data, to generate a backup copy, the contents of the original data set including a plurality of changes each identified by a replication identification number of the node and a serial number; and after taking the snapshot, resetting the state data of the original data set to again indicate that the original data set is original data rather than backup data.

2. A computer-readable medium as in claim 1, having further computer-executable instructions for performing the steps of:

restoring the original data set using the backup copy;

detecting that the state data of the restored data set indicates that the data set backup data;

in response to the detecting, changing the replication identification number of the node from an old value used before the backup operation to a new value.

3. A computer-readable medium as in claim 2, having further computer-executable instructions for performing the step of storing into the original data set a lowest uncommitted serial number that corresponds to a lowest one of the serial numbers of changes made to the original data set that are not yet committed prior to taking the snapshot.

4. A computer-readable medium as in claim 3, having further computer-readable instructions for performing the step of requesting a second node in the distributed system to replicate changes that have the old value of the replication identification number of the node and serial numbers equal or higher than said lowest uncommitted serial number.

5. A computer-readable medium as in claim 2, having further computer-executable instructions for performing the step of storing in the original data set, prior to taking the snapshot, a next serial number to be assigned to a new change to the original data set.

6. A computer-readable medium as in claim 1, wherein the replication identification number of the node is a computed Globally Unique Identifier (GUID).

7. A computer-readable medium as in claim 1, wherein the distributed system is a directory service system and the data set of the node contains directory data.

8. A method for backing up and restoring contents of a data set of a node in a distributed system, comprising:
   initiating a back up operation of an original data set, original the data set having state data indicating that the original data set is original data rather than backup data;
   before making a backup copy of the original data set, changing state data of the original data set to indicate that the original data set backup data;
   after changing the state data of the original data set, taking a snapshot of the contents of the original data set, including the state data indicating that the original data set is backup data, to generate a backup copy, the contents of the data set including a plurality of changes each identified by a replication identification number of the node and a serial number; and
   after taking the snapshot, resetting the state data of the original data set to again indicate that the original data set is original data rather than backup data.

9. A method as in claim 8, further including the steps of:
   restoring the original data set using the backup copy;
   detecting that the state data of the restored data set indicates that the data set is backup data; and
   in response to the detecting, changing the replication identification number of the node from an old value used before the backup operation to a new value.

10. A method as in claim 9, further including the step of storing into the original data set a lowest uncommitted serial number that corresponds to a lowest one of serial numbers of changes made to the original data set that are not yet committed prior to taking the snapshot.

11. A method as in claim 10, further including the step of requesting a second node in the distributed system to replicate changes that have the old value of the replication identification number of the node and serial numbers equal to or higher than said lowest uncommitted serial number.

12. A method as in claim 9, further including the step of storing in the original data set, prior to talking the snapshot, a next serial number to be assigned to a new change to the original data set.

13. A method as in claim 8, further including the step of setting the replication identification number of the node as a computed Globally Unique Identifier (GUID).

14. A method as in claim 8, wherein the distributed system is a directory service system and the data set of the node contains directory data.

15. A computer system for acting as a node in a distributed system, the computer system comprising:
   a data manager for maintaining a data set containing a plurality of changes each identified by a replication identification number of the node and a serial number, the original data set having state data indicating that the original data rather than backup data;
   a replication server for replicating changes made to the original data set to other nodes in the distributed system;
   a backup server for generating a backup copy of the original data set, the backup server being programmed to: (i) cause the state data of the original data set to be set to indicate that the original data set is backup data before making a backup copy of the original data set, (ii) after changing the state data of the original data set, take a snapshot of the contents of the original data set, including the state data indicating that the data set is backup data, to generate the backup copy of original data set, and (iii) cause the state data of the original data set to be reset after taking the snapshot to again indicate that the original data set is original data rather than backup data.

16. A computer system as in claim 15, wherein the replication server is programmed to detect, after the original data set is restored from the backup copy, that the state data of the restored data set indicates that the restored data set is backup data and change the replication identification number of the node from an old value used before the snapshot to a new value.

17. A computer system as in claim 16, wherein the replication server is further programmed to store into the original data set a lowest uncommitted serial number that corresponds to a lowest one of serial numbers of changes made to the original data set that are not yet committed prior to taking the snapshot.

18. A computer system as in claim 17, wherein the replication server is further programmed to request a second node in the distributed system to replicate changes that have the old value of the replication identification number of the node and serial numbers equal or higher than said lowest uncommitted serial number.

19. A computer system as in claim 16, wherein the replication server is further programmed to store in the original data set, prior to taking the snapshot, a next serial number to be assigned to a new change to the original data set.

20. A computer system as in claim 15, wherein the replication identification number of the node is a computed Globally Unique Identifier (GUID).

21. A computer system as in claim 15, wherein the distributed system is a directory service system and the data set of the node contains directory data.

22. A computer-readable medium as in claim 1, wherein the state data is a collective value for the original data set.

23. A computer-readable medium as in claim 1, wherein the distributed system is Active Directory.

* * * * *